Patented Nov. 23, 1948

2,454,387

UNITED STATES PATENT OFFICE 2,454,387

ISOMERIZATION OF MALEIC ACID TO FUMARIC ACID

Louis H. Howland, Watertown, and William F. Brucksch, Jr., Bethany, Conn., assignors to United States Rubber Company, New York, N. Y., a corporation of New Jersey No Drawing. Application April 27, 1946, Serial No. 665,633

7 Claims. (Cl. 260—537)

This invention relates to the conversion of cis alpha-beta unsaturated carboxylic acids to their trans isomers, and more particularly of maleic acid to fumaric acid. An object of this invention is to provide a catalytic means whereby the cheap and abundant maleic anhydride is easily and readily converted into fumaric acid.

It is known that the isomerization of maleic acid to fumaric acid is accelerated by various inorganic materials such as iodine, bromine, hydrochloric acid, hydrobromic acid, sulfuric acid, potassium thiocyanate, sodium bromide and ammonia. Pyridine has also been observed to catalyze the rearrangement. For a proposed mechanism of the isomerization and a discussion of the prior art, reference is made to the publications of Nozaki and Ogg in Journal American Chemical Society, 63, 2583 (1941), and of Nozaki, Ibid 63, 2681 (1941). As pointed out by these authors, the catalysts used for the isomerization of maleic acid are equally usable for the cis-trans isomerization of all alpha-beta unsaturated carboxylic acids. The same is true of the catalysts of this invention.

The present invention relates to the discovery that compounds containing the structural unit

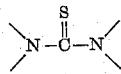

are capable of accelerating the conversion of maleic acid to fumaric acid. To this class belongs the thioureas and the closely related semicarbazides in which one of the nitrogens is joined to another amino grouping as in

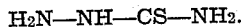

Exemplary of such chemicals are: thiourea, N-methyl thiourea, N-ethyl thiourea, N-butyl thiourea, N-dodecyl thiourea, N-allyl thiourea, N-methallyl thiourea, N-b-methoxy ethyl thiourea, N-b-hydroxy ethyl thiourea, N-phenyl thiourea, N-p-chloro phenyl thiourea, N-p-tolyl thiourea, N-beta naphthyl thiourea, N,N'-dimethyl thiourea, N,N'-diethyl thiourea, N,N'-dipropyl thiourea, N,N'-diallyl thiourea, N,N'-dibenzyl thiourea, N,N'-diphenyl thiourea (thiocarbanilide), N,N,N' - trimethyl thiourea, N,N,N'-triethyl thiourea, N,N,N'-triphenyl thiourea, N,N,N',N'-tetramethyl thiourea, N,N,N',N'-tetrabenzyl thiourea, N,N,N'-tetraphenyl thiourea, and N,N'-dipentamethylene thiourea.

The conversion of maleic acid to fumaric acid is conveniently carried out in water solution at an elevated temperature. Fumaric acid being relatively water-insoluble separates as soon as its concentration exceeds its solubility. At the end of the isomerization the water mixture is cooled, filtered, and the fumaric acid purified by washing with water or digestion with 1 N hydrochloric acid. The yield of the fumaric acid is dependent upon the concentration of the maleic acid, the amount of catalyst, and the temperature of the conversion.

In general, a temperature of at least 50° C. should be maintained, and preferably the temperature should be at or slightly below the boiling point of the water solution. Stirring is recommended to prevent bumping and spattering caused by the suspended fumaric acid. The optimum concentration of the maleic acid for each thiourea can be determined experimentally by adding 2% of the thiourea to a gently boiling aqueous solution of maleic acid based on the total weight of solution and refluxing for 2 hours. The reaction mixture is then cooled, diluted with water, filtered, and the separated fumaric acid washed with water and dried. The preferable maleic acid concentration usually lies in the range of 40-60%. Above about 60% maleic acid concentration, the yield decreases.

The amount of catalyst necessary can be varied over a wide range generally from 0.1 to 5% based upon the total concentration of the maleic acid solution. If the catalyst is particularly vigorous, it may be added gradually as a powder, or as a concentrated water solution.

The following table lists the yields of fumaric acid obtained by the addition of 2 grams catalyst to a gently boiling solution of 60 grams maleic anhydride in 40 grams water and heating for 2 hours, cooling, diluting with water, filtering and drying the fumaric acid.

| Catalyst | Per cent Yield Fumaric Acid |
|---|---|
| Thiourea | 76.2 |
| Thiosemicarbazide | 64.2 |
| Tetrabenzyl Thiourea | 56.4 |
| Allyl Thiourea | 52.5 |
| Diethyl Thiourea | 31.5 |
| 4-Phenyl Thiosemicarbazide | 25.0 |
| Thiocarbanilide | 17.8 |
| Blank | 0.0 |

While the invention has been described in particular detail for the isomerization of maleic acid to fumaric acid, it is also applicable, as aforesaid, to the cis-trans isomerization of all alpha-beta unsaturated carboxylic acids; for example, isocrotonic acid, citraconic acid, isocinnamic acid, and cis-methyl glutaconic acid, among many others.

While we have shown and described various embodiments of the invention, it is to be understood that the invention is susceptible to those modifications which appear within the spirit of the invention and the scope of the appended claims.

Having thus described our invention, what we claim and desire to protect by Letters Patent is:

1. A method of converting a cis alpha-beta unsaturated dicarboxylic acid to its trans isomer which comprises heating it in an aqueous medium with a compound containing the structural unit

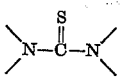

2. A method of converting a cis alpha-beta unsaturated dicarboxylic acid to its trans isomer which comprises heating it to at least 50° C., in an aqueous medium in the presence of a compound containing the structural unit

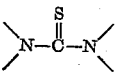

3. A method of converting a cis alpha-beta unsaturated dicarboxylic acid to its trans isomer which comprises heating it to at least 50° C. in an aqueous medium in the presence of a thiourea.

4. A method of converting maleic to fumaric acid which comprises heating in water solution between 50° C. and the boiling point of the solution in the presence of a thiourea.

5. A method of converting maleic to fumaric acid which comprises heating in water solution between 50° C. and the boiling point of the solution in the presence of thiourea.

6. A method of converting maleic to fumaric acid which comprises heating in water solution between 50° C. and the boiling point of the solution in the presence of tetrabenzyl thiourea.

7. A method of converting maleic to fumaric acid which comprises heating in water solution between 50° C. and the boiling point of the solution in the presence of diethyl thiourea.

LOUIS H. HOWLAND.
WILLIAM F. BRUCKSCH, Jr.

REFERENCES CITED

The following references are of record in the file of this patent:

UNITED STATES PATENTS

| Number | Name | Date |
| --- | --- | --- |
| 2,404,103 | Scott | July 16, 1946 |

OTHER REFERENCES

Clemo et al., "Jour. Chem. Soc." (London), Pt. 1 (1930), pages 213–215.

Taube, J. Am. Chem. Soc., vol. 65, page 526 (1943).

Certificate of Correction

Patent No. 2,454,387.  November 23, 1948.

LOUIS H. HOWLAND ET AL.

It is hereby certified that error appears in the printed specification of the above numbered patent requiring correction as follows:

Column 1, line 50, for "N,N,N'-tetraphenyl" read *N,N,N',N'-tetraphenyl*;

and that the said Letters Patent should be read with this correction therein that the same may conform to the record of the case in the Patent Office.

Signed and sealed this 15th day of March, A. D. 1949.

[SEAL]

THOMAS F. MURPHY,
*Assistant Commissioner of Patents.*

Disclaimer 2,454,387.—*Louis H. Howland*, Watertown, and *William F. Brucksch, Jr.*, Bethany, Conn. ISOMERIZATION OF MALEIC ACID TO FUMARIC ACID. Patent dated Nov. 23, 1948. Disclaimer filed Aug. 19, 1950, by the assignee, *United States Rubber Company*.

Hereby disclaims claims 1 to 5, inclusive.

[*Official Gazette September 19, 1950.*]